US011866097B2

(12) United States Patent
Kim et al.

(10) Patent No.: US 11,866,097 B2
(45) Date of Patent: Jan. 9, 2024

(54) LOWER CROSS MEMBER OF VEHICLE

(71) Applicants: Hyundai Motor Company, Seoul (KR); Kia Motors Corporation, Seoul (KR); KOLONGLOTECH, Inc., Seoul (KR)

(72) Inventors: Hyun Sik Kim, Seoul (KR); Sang Yoon Park, Seoul (KR); Deok Hwa Hong, Gyeonggi-do (KR); Hee Seouk Chung, Gyeonggi-do (KR); Byeong Cheon Lee, Seoul (KR); Yeun Ho Yu, Gyeongsangnam-do (KR); Young Gyu Kim, Gyeongsangnam-do (KR); Jeong Wan Han, Gyeongsangnam-do (KR); Hyeon Seok Do, Daegu (KR); Hyun Kyu Shin, Seoul (KR); Cheol Min Nam, Seoul (KR); Kum Soo Bae, Seoul (KR); Seong Jong Kim, Gyeonggi-do (KR); Jun Youp Kim, Daejeon (KR)

(73) Assignees: Hyundai Motor Company, Seoul (KR); Kia Motors Corporation, Seoul (KR); Kolonglotech, Inc., Seoul (KR)

( * ) Notice: Subject to any disclaimer, the term of this patent is extended or adjusted under 35 U.S.C. 154(b) by 499 days.

(21) Appl. No.: 16/994,880

(22) Filed: Aug. 17, 2020

(65) Prior Publication Data
US 2021/0179190 A1 Jun. 17, 2021

(30) Foreign Application Priority Data
Dec. 16, 2019 (KR) .................. 10-2019-0167866

(51) Int. Cl.
*B62D 25/20* (2006.01)
*B62D 29/04* (2006.01)
*B32B 5/26* (2006.01)

(52) U.S. Cl.
CPC ............... *B62D 25/20* (2013.01); *B32B 5/26* (2013.01); *B62D 29/041* (2013.01);
(Continued)

(58) Field of Classification Search
CPC ........ B62D 25/20; B62D 29/041; B32B 5/26; B32B 2262/0253; B32B 2262/0269; B32B 2262/101; B32B 2262/106; B32B 2605/00
See application file for complete search history.

(56) References Cited

U.S. PATENT DOCUMENTS

2018/0001525 A1* 1/2018 Imamura ........... B29C 45/14475
2019/0283805 A1* 9/2019 Kurokawa ............. B62D 21/02

FOREIGN PATENT DOCUMENTS

KR 10-1840580 B1 3/2018

* cited by examiner

*Primary Examiner* — Frank J Vineis
*Assistant Examiner* — Laura B Figg
(74) *Attorney, Agent, or Firm* — Fox Rothschild LLP

(57) ABSTRACT

Disclosed is a lower cross member of a vehicle. The lower cross member includes a core member configured to be disposed on a vehicle floor so as to extend in a width direction of the vehicle, to be formed of a composite material including unidirectional carbon fiber or bidirectional carbon fiber, and to have a cross-section including at least one closed curve, a lower layer configured to extend in an extending direction of the core member, to be disposed between the core member and the vehicle floor, and to be formed of a composite material including a first multi-axial glass fabric, and an upper layer configured to extend in the extending direction of the core member, to be disposed on an upper surface of the core member, and to be formed of a composite material including a second multi-axial glass fabric.

13 Claims, 9 Drawing Sheets

(52) U.S. Cl.
CPC ......... *B32B 2262/0253* (2013.01); *B32B 2262/0269* (2013.01); *B32B 2262/101* (2013.01); *B32B 2262/106* (2013.01); *B32B 2605/00* (2013.01)

LOWER CROSS MEMBER OF VEHICLE

CROSS-REFERENCE TO RELATED APPLICATION

This application claims the priority benefit of Korean Patent Application No. 10-2019-0167866, filed on Dec. 16, 2019, in the Korean Intellectual Property Office, the disclosure of which is incorporated herein by reference.

TECHNICAL FIELD

The present invention relates to a lower cross member of a vehicle. Particularly, provided herein is a new type of seat cross member which may contribute to increase load dispersion, buckling resistance and rigidity, reduce the number of parts and the number of processes, and reduce weight and costs.

BACKGROUND OF THE INVENTION

Among performance factors of an electric vehicle, a range is an important factor in determining whether or not a consumer purchases the vehicle. Particularly, in contrast with a hybrid electric vehicle (HEV) or a fuel-cell electric vehicle (FCEV), a battery electric vehicle (BEV), which is driven using batteries, has no separate charging unit configured to charge the batteries during driving, and thus, the range is a very important performance factor. There are various methods for increasing the range of the BEV, and fundamentally, a large number of batteries must be mounted so as to ensure a sufficient range. In this sense, in the case of most electric vehicles, batteries are disposed under a passenger compartment.

However, if batteries are disposed in the lower portion of a vehicle, impact is applied to the batteries due to vehicle body deformation during side collision, thus causing a fire risk. In order to prevent such a problem, a sufficient collision space between a side sill of a vehicle body and the batteries must be maintained, and as the collision space is increased, battery capacity is decreased in proportion to an increase and the benefits of disposition of the batteries in the lower portion of the vehicle may be lost. Therefore, side collision performance of the electric vehicle not only serves simply to protect passengers but also serves as an important performance factor in terms of securing the range.

In general, as a strategy for coping with side collision of an electric vehicle to protect batteries, a side sill region is set to an energy absorption space and a remaining indoor space is set to a safety space, as will be described below. In order to effectively cope with side collision, the energy absorption space must be maximally deformed to absorb collision energy, and deformation of the safety space must be minimized to avoid contact between a vehicle body and the batteries. For this purpose, indoor cross members of the vehicle must have a high enough strength not to be deformed during side collision.

The above description has been provided to aid in understanding of the background of the present invention and should not be interpreted as conventional technology known to those skilled in the art.

SUMMARY OF THE INVENTION

In preferred aspect, provided is a new type of lower cross member which may contribute to increase load dispersion, buckling resistance and rigidity, reduce the number of parts and the number of processes, and reduce weight and costs.

In one aspect, provided is a lower cross member of a vehicle including: i) a core member configured to be disposed on a vehicle floor so as to extend in a width direction of the vehicle, to be formed of a composite material including unidirectional carbon fiber or bidirectional carbon fiber, and to have a cross-section including at least one closed curve, ii) a lower layer configured to extend in an extending direction of the core member, to be disposed between the core member and the vehicle floor, and to be formed of a composite material including a first multi-axial glass fabric, and iii) an upper layer configured to extend in the extending direction of the core member, to be disposed on an upper surface of the core member, and to be formed of a composite material including a second multi-axial glass fabric. A term "glass fabric" as used herein suitably may include multiple yarns containing glass filaments or fibers. Glass filaments and glass fibers may include composites of glass and non-glass materials, for example such as glass-polyester blends or glass-olefin composites (e.g. Twintex®, St. Gobain Corporation) and other olefin coated C or E glass fibers and fabrics. In addition, a "glass" can be considered an inorganic product of fusion that has cooled to a rigid condition without crystallizing. For instance, a glass fiber suitably may be spun from an inorganic product of fusion that has cooled to a rigid condition without crystallizing.

The term "multi-axial" as used herein refers to having directional proprieties along more than one axis. For example, the multi-axial fabric may have strength (e.g., elongation, inherent strength, or major tensile strength) directions along more than one axis (direction). Thus, the multi-axial glass fabric as used herein may include glass fibers arranged in many directions, for example, as arranged in bundles or groups, without limitations to the number of directions. The multi-axial glass fabric may be formed by arranging glass fibers in random or irregular patterns or directions at various angles, e.g., ranging from ±5°, ±10°, ±15°, ±20°, ±25°, ±30°, ±35°, ±40°, ±45°, ±50°, ±55°, ±60°, ±65°, ±70°, ±75°, ±80°, ±85°, ±90°, ±95°, ±100°, ±105°, ±110°, ±115°, ±120°, ±125°, ±130°, ±135°, ±140°, ±145°, ±150°, ±155°, ±160°, ±165°, ±170°, ±175°, or ±180°.

The first and second multi-axial glass fabric may be the same or different type. For example, if the first and second multi-axial glass fabrics are different, a first multi-axial glass fabric may have glass fibers arranged in random or irregular patents and the second multi-axial glass fabric may have fibers arranged in patterns of differing angles. Alternatively, both the first and second multi-axial glass fabrics may be regular patterns but with fibers in the pattern in differing orientations, for example where the fibers differ by at least 5, 10, 20, 25, 30, 35, 40, 45, 60, 70, 80 or 90 degrees between the respective patterns of the first and second multi-axial glass fabrics.

The lower cross member may include at least one inner member configured to be coupled to an inner circumferential surface of the core member along the closed curve formed by the cross-section of the core member, to extend in the extending direction of the core member, and to be formed of a composite material including a third multi-axial glass fabric.

The third multi-axial glass fabric may be the same type with at least one selected from the first and second multi-axial glass fabric, or different type from the first and second multi-axial glass fabric. For example, if the first and second multi-axial glass fabrics are the same such as both being non-random with fibers arranged in the same orientation(s), a third multi-axial glass fabric may have glass fibers arranged in random or irregular patents. Alternatively, each of the first, second and third-axial glass fabrics may be regular patterns but with fibers in the pattern in differing orientations, for example where the fibers differ by at least 5, 10, 20, 25, 30, 35, 40, 45, 60, 70, 80 or 90 degrees between the respective patterns of the first, second and third multi-axial glass fabrics.

The core member may include a horizontal part configured to be coupled to an upper surface of the lower layer, a reinforcing part configured to protrude from the horizontal part in an upward direction of the vehicle to form an inner space therein, and extension parts configured to respectively extend from front and rear ends of the horizontal part in forward and backward directions of the vehicle, and the upper layer may be formed to have a shape covering the reinforcing part and the extension parts of the core member.

The core member may include a horizontal part configured to be coupled to an upper surface of the lower layer, and a reinforcing part configured to protrude from the horizontal part in an upward direction of the vehicle to form an inner space therein, both ends of the lower layer and the upper layer extending in the forward and backward directions of the vehicle may be connected to each other so as to surround the core member so that the lower layer and the upper layer are coupled to the core member, and an inner member formed along the closed curve of the core member may be coupled to an inner circumferential surface of the core member.

Each of the lower layer and the upper layer may be formed of a composite material including non-conductive glass fiber, aramid fiber or polyethylene fiber.

The at least one inner member may be formed of a composite material including multi-axial glass fiber, aramid fiber or polyethylene fiber.

A support part configured to extend in a direction intersecting an extending direction of the horizontal part and to traverse an inner space formed by the horizontal part and the reinforcing part may be provided between the horizontal part and the reinforcing part of the core member.

A plurality of mounting holes may be formed through the lower cross member from an upper surface of the upper layer in a vertical direction of the vehicle.

The core member may include a horizontal part configured to be coupled to an upper surface of the lower layer and a reinforcing part configured to protrude from the horizontal part in an upward direction of the vehicle to form an inner space therein, and a rib part configured to be located adjacent to the mounting holes so as to increase strength of the lower cross member in the vertical direction of the vehicle and to traverse an inner space formed by the reinforcing part in a direction intersecting an extending direction of the horizontal part may be provided between the horizontal part and the reinforcing part of the core member.

The rib part may be formed of a composite material including multi-axial glass fiber, or unidirectional carbon fiber.

Flange parts configured to be bent upwards from both ends of the lower layer extending in the forward and backward directions of the vehicle so as to surround both ends of the core member and the upper layer extending in the forward and backward directions of the vehicle may be formed.

A recess configured to be sunken in may be formed in an upper surface of the upper layer or a lower surface of the lower layer, and the recess may extend in an extending direction of the upper layer or the lower layer.

Through holes may be formed through the lower cross member in the forward and backward directions of the vehicle, and a part extending in the forward and backward directions of the vehicle may pass through the lower cross member via the through holes.

Further provided is a vehicle including the lower cross member described herein.

Other aspects of the invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
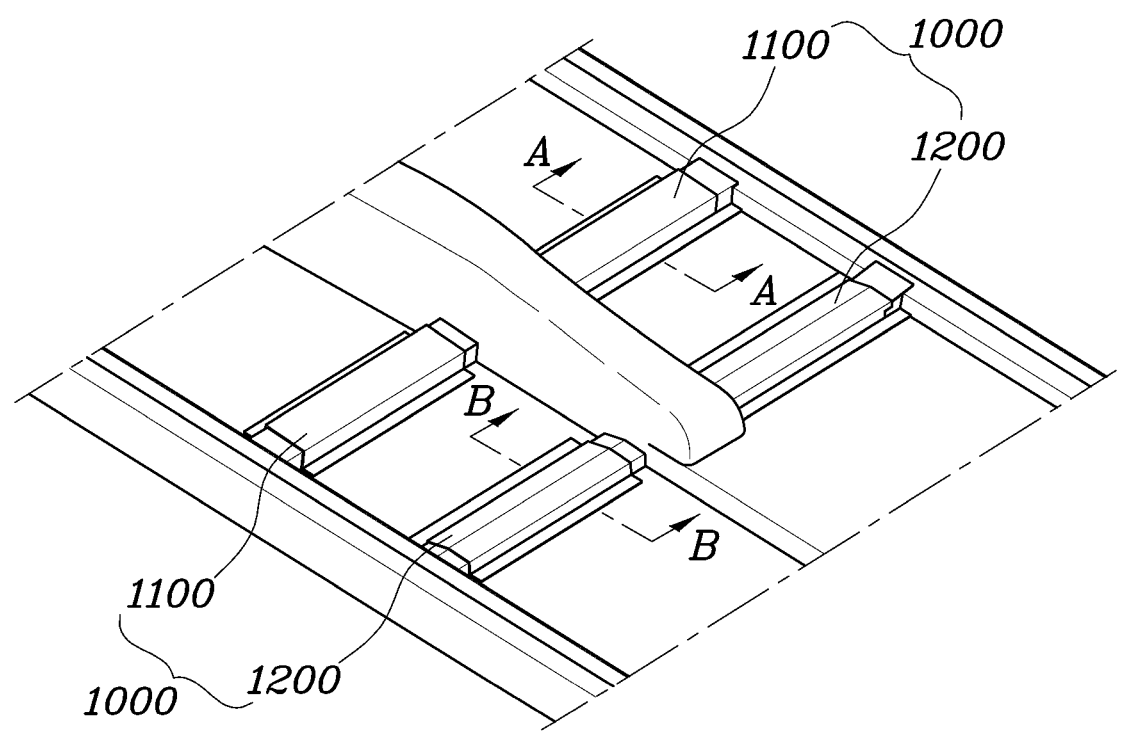
FIG. 1 shows an exemplary lower cross member according to an exemplary embodiment of the present invention.

Specific structural or functional descriptions in embodiments of the present invention set forth in the description which follows will be exemplarily given to describe the embodiments of the present invention. However, the present invention may be embodied in many alternative forms, and should not be construed as being limited to the embodiments set forth herein.

The embodiments of the present invention may be variously modified and changed, and thus specific embodiments of the present invention will be illustrated in the drawings and described in detail in the following description of various exemplary embodiments of the present invention. However, these exemplary embodiments of the present invention are provided only to completely disclose the invention and to completely inform those skilled in the art of the scope of the invention.

In the following description of the embodiments, it will be understood that, when the terms "first", "second", etc. are used to describe various elements, these terms are not used to limit the elements. That is, these terms are used merely to distinguish one element from other elements. For example, a first element may be named a second element and similarly a second element may be named a first element, within the technical scope of the invention, unless stated otherwise.

In the following description of the embodiments, it will be understood that, when an element is "connected to", "coupled to", etc. another element, the two elements may be directly connected or coupled, or one or more other elements may be interposed between the two elements. On the other hand, it will be understood that, when an element is "directly connected to", "directly coupled to", etc. another element, no elements may be interposed between the two elements. In the following description of the embodiments, other terms expressing relations between elements, such as "between" and "directly between" or "adjacent to" and "directly adjacent to", will be interpreted in the same manner.

It will be understood that terms used in the following description of the embodiments are used only to describe specific embodiments and are not intended to limit the invention, and a singular expression of an element encompasses a plural expression of the element, unless stated otherwise. In the following description of the embodiments, terms "including", "having", etc. will be interpreted as indicating presence of characteristics, numbers, steps, operations, elements or parts stated in the specification or combinations thereof, and do not exclude presence of one or more characteristics, numbers, steps, operations, elements, parts or combinations thereof, or a possibility of adding the same.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

It will be understood that all terms, including technical or scientific terms, used in the following description of the embodiments have the same meanings as those which are generally understood by those skilled in the art, unless defined otherwise. Also, it will be interpreted that terms defined in generally used dictionaries have meanings coinciding with contextual meanings in the related art, and do not have ideal or excessively formal meanings unless clearly defined.

Hereinafter, reference will be made in detail to the exemplary embodiments of the present invention, examples of which are illustrated in the accompanying drawings. In the following description of the embodiments and the drawings, the same or similar elements are denoted by the same reference numerals even when they are depicted in different drawings.

As shown in FIGS. 1 to 3 and FIG. 4A to FIG. 5B, a lower cross member 1000 of a vehicle according to an exemplary embodiment of the present invention includes i) a core member 100 disposed on a vehicle floor so as to extend in the width direction of the vehicle, formed of a composite material including unidirectional carbon fiber or bidirectional carbon fiber, and having a cross-section including at least one closed curve, ii) a lower layer 200 configured to extend in the extending direction of the core member 100, disposed between the core member 100 and the vehicle floor, and formed of a composite material including a first multi-axial glass fabric, and iii) an upper layer 300 configured to extend in the extending direction of the core member 100, disposed on the upper surface of the core member 100, and formed of a composite material including a second multi-axial glass fabric.

The present invention provides a lower cross member structure of a passenger compartment for satisfying side collision performance of an electric vehicle (EV) in which batteries are mounted in a lower portion of the vehicle. During side collision of the electric vehicle (EV), if a side sill severely invades the passenger compartment, the side sill hits the batteries and thus causes serious safety problems, such as fire. In conventional technology, since lower cross members of a passenger compartment are formed of steel or aluminum, when side collision occurs, the lower cross members are greatly damaged, a side sill severely invades a passenger compartment, and therefore, in order to protect batteries, a space between the batteries and the side sill must be sufficiently widened. However, in this case, the absolute size of the batteries is decreased, and thereby, the range of an electric vehicle (EV) is reduced.

Therefore, in order to solve the above problem, provided herein is a lower cross member structure of a passenger compartment which may minimize invasion of a side sill into the passenger compartment during side collision, thereby being capable of ensuring side collision stability only using a space between batteries and the side sill and maximizing the range of an electric vehicle therethrough.

Among performance factors of an electric vehicle, a range is an important factor in determining whether or not a consumer purchases the vehicle. Particularly, in contrast with a hybrid electric vehicle (HEV) or a fuel-cell electric vehicle (FCEV), a battery electric vehicle (BEV), which is driven using batteries, has no separate charging unit configured to charge the batteries during driving, and thus, the range is a very important performance factor. There are various methods for increasing the range of the BEV, and fundamentally, a large number of batteries must be mounted so as to ensure a sufficient range. In this sense, in the case of most electric vehicles, batteries may be disposed under a passenger compartment.

However, if the batteries are disposed in the lower portion of the vehicle, impact is applied to the batteries due to vehicle body deformation during side collision, thus causing a fire risk. In order to prevent such a problem, a sufficient collision space between the side sill of the vehicle body and the batteries must be maintained, and as the collision space is increased, battery capacity is decreased in proportion to such an increase and thus the benefits of disposition of the batteries in the lower portion of the vehicle may be lost.

Therefore, side collision performance of the electric vehicle not only serves simply to protect passengers but also serves as an important performance factor in terms of securing the range. In order to effectively cope with side collision, an energy absorption section must be maximally deformed so as to absorb collision energy, and deformation of a safety space must be minimally maintained so as to suppress contact between the vehicle body and the batteries. For this purpose, indoor cross members of the vehicle must have a high enough strength not to be deformed during side collision.

Thus, provided herein is a composite material including carbon fiber, glass fiber or resin as an anisotropic material which is applied to the indoor cross members, strength of the indoor cross members in each direction may be determined based on designer's needs.

For example, in order to increase strength of the cross members in the width direction of the vehicle, a maximum amount of unidirectional carbon fiber may be disposed in the width direction of the vehicle which is formed by extending the core member 100.

However, when the carbon fiber is disposed only in the width direction, the core member 100 may be easily fractured when cracks occur due to external contact, buckling or the load of the vehicle in forward and backward directions or in the vertical direction. Therefore, the upper layer 300 formed of the composite material including the second multi-axial glass fabric may be disposed on the upper surface of the core member 100.

Further, since, the core member 100 is formed of the carbon fiber, the lower layer 200 formed of a non-conductive material, which may block electrical conduction to vehicle body parts formed of other materials and prevent galvanic corrosion, may be disposed on the lower surface of the core member 100.

In addition, at least one inner member 400, which is coupled to the inner circumferential surface of the core member 100 along the closed curve formed by the cross-section of the core member 100, extends in the extending direction of the core member 100, and is formed of a composite material including a third multi-axial glass fabric, may be provided.

The inner member 400 may have the same characteristics and functions as the upper layer 300, i.e., may prevent the core member 100 from being easily fractured when the core member 100 is slightly cracked due to external contact, buckling or the load of the vehicle in forward and backward directions or the load of the vehicle in the vertical direction.

Therefore, as shown in FIGS. 1 to 3 and FIGS. 4A to 5B, as the lower cross members 1000, a plurality of front cross members 1100 and a plurality of rear cross members 1200, which are manufactured to have the same configuration using the same materials as described above, may be provided. Since the front cross members 1100 and the rear cross members 1200 may have the same configuration but different shapes, both the front cross members 1100 and the rear cross members 1200 will be defined as lower cross members 100 for convenience in description.

Figure 2:
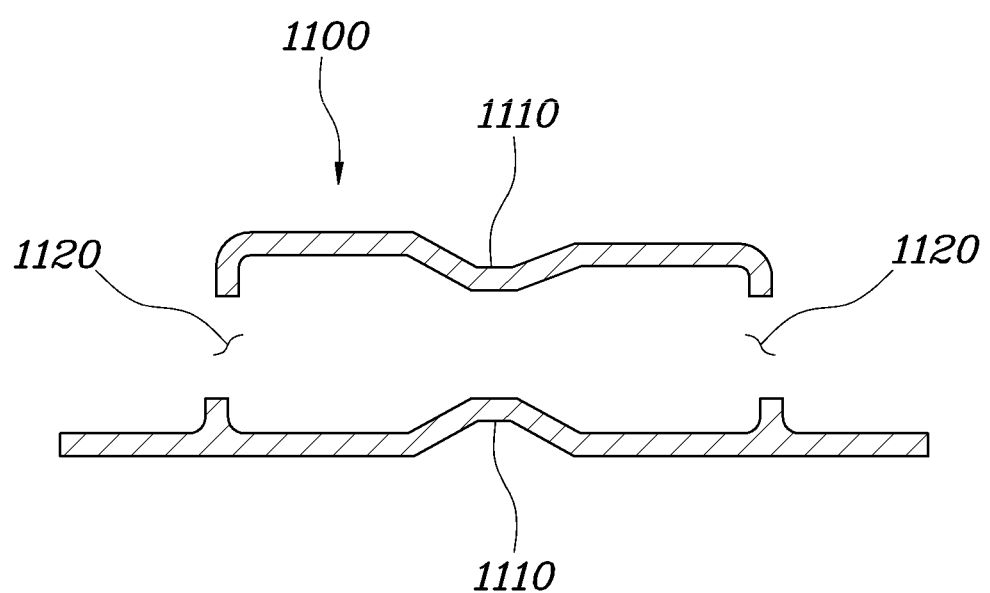
FIG. 2 shows a cross-sectional view of FIG. 1 taken along line A-A.

As shown in FIG. 2, through holes 1120 may be formed through the front cross member 1100 in the forward and backward directions of the vehicle, and a part extending in the forward and backward directions of the vehicle may pass through an inner space 410 formed in front cross member 1100 via the through holes 1120.

A recess 1110 which is sunken in may be formed in the upper surface of the upper layer 300 or the lower surface of the lower layer 200, and the recess 1100 may extend in the extending direction of the upper layer 300 or the lower layer 200.

Preferably, the recess 1100 may more effectively absorb and support side collision, and the recess 1100 may be formed adjacent to a path through which an air conditioning duct passing the through holes 1120 or an electric wire passes.

Figure 3:
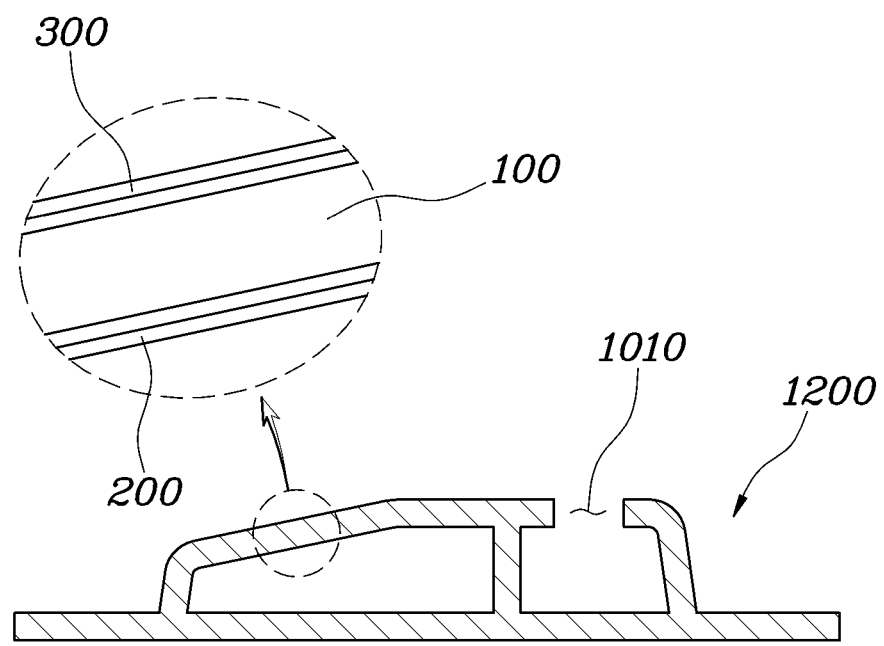
FIG. 3 shows a cross-sectional view of FIG. 1 taken along line B-B.
Figure 4A:
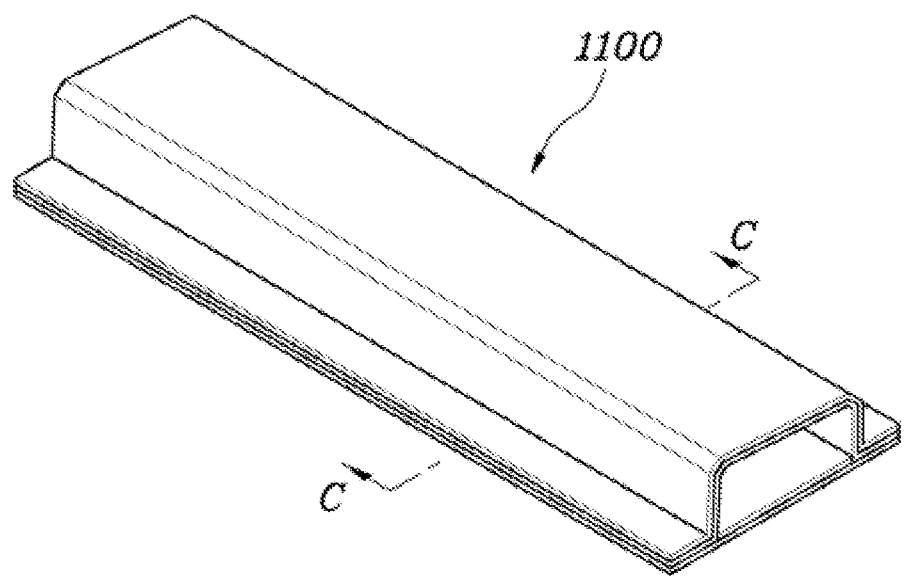
FIG. 4A shows a perspective view illustrating a front cross member of FIG. 1.
Figure 4B:
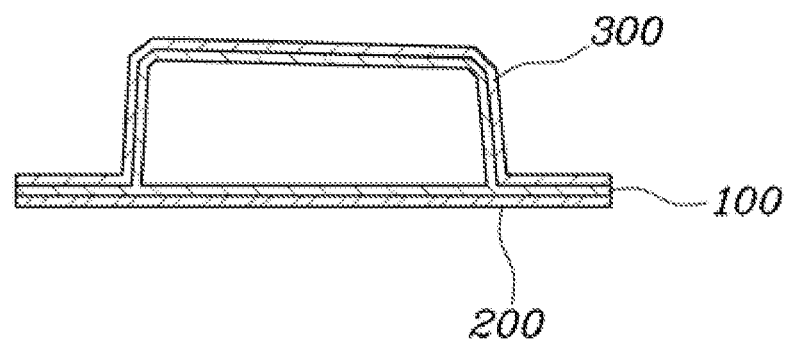
FIG. 4B shows a cross-sectional view of FIG. 4(a) taken along line C-C.
Figure 5A:
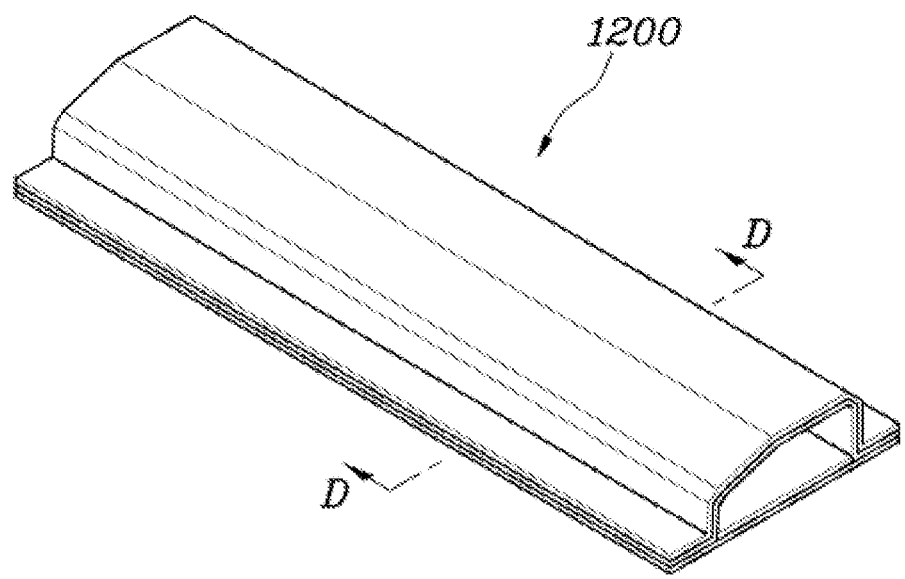
FIG. 5A shows a perspective view illustrating a rear cross member of FIG. 1.
Figure 5B:
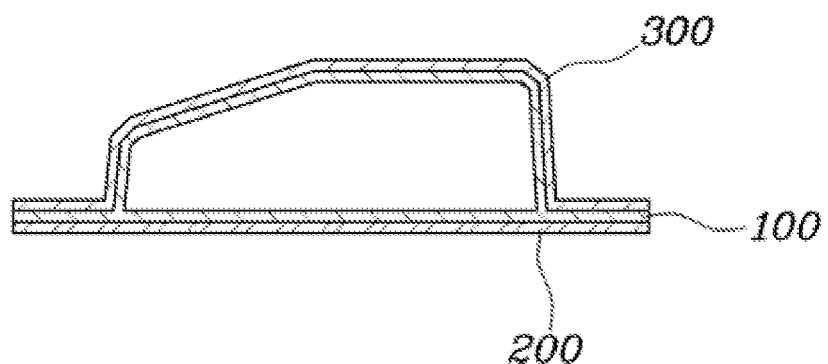
FIG. 5B shows a cross-sectional view of FIG. 5(a) taken along line D-D.

Further, as shown in FIG. 3, a plurality of mounting holes 1010 may be formed through the rear cross member 1200 from the upper surface of the upper layer 300 in the vertical direction of the vehicle.

That is, the rear cross member 1200 may be coupled to a seat fame of the vehicle through the mounting holes 1010. An indoor cross member, such as a seat cross member, needs to cope with high-strength mounting, such as seat mounting. For example, only the mounting holes 1010 and the regions of the rear cross member 1200 around the mounting holes 1010 separately require high strength, and thus it may be difficult for the rear cross member 1200, designed only to cope with collision load, to cope with such high-strength mounting.

In order to solve such a problem, if the compositions of the composite material of the rear cross member 1200 are changed, the overall weight of the rear cross member 1200 may be increased. Therefore, a steel reinforced panel may be further provided on the inner surface of the rear cross member 1200 or the upper surface of the rear cross member 1200 at regions adjacent to the mounting holes 1010.

In addition, a rib part 500, which is located adjacent to the mounting holes 1010 so as to increase strength of the rear cross member 1200 in the vertical direction of the vehicle and is provided between a horizontal part 110 and a reinforcing part 120 of the core member 100 so as to traverse the inner space 410 formed by the reinforcing part 120 in a direction intersecting the extending direction of the horizontal part 110, may be further provided.

The core member 100 may be formed of the unidirectional carbon fiber or the bidirectional carbon fiber, as described above, and each of the lower layer 200, the upper layer 300 and the rib part 500 may include one or more layers formed of multi-axial glass fiber or resin. Preferably, the glass fiber may be woven by crossing threads at an angle of about +45° and threads at an angle of about −45°.

Figure 6:
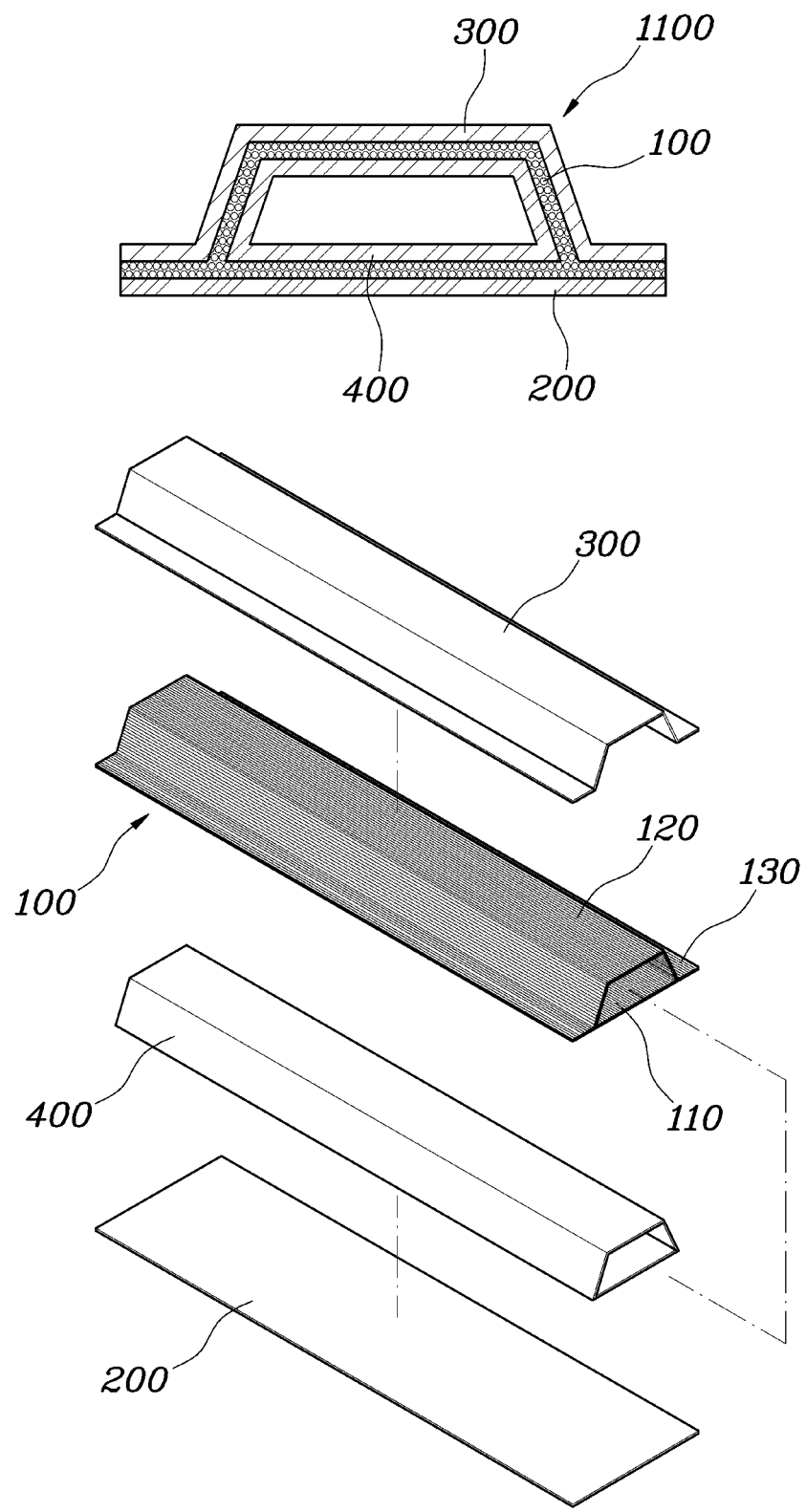
FIG. 6 shows an exploded perspective view illustrating an exemplary lower cross member according to an exemplary embodiment of the present invention.

As shown in FIG. 6, in the lower cross member 1000 according to an exemplary embodiment of the present invention, the core member 100 may include the horizontal part 110 coupled to the upper surface of the lower layer 200, the reinforcing part 120 protruding from the horizontal part 110 in the upward direction of the vehicle to form an inner space therein, and extension parts 130 respectively extending from the front and rear ends of the horizontal part 110 in the forward and backward directions of the vehicle, and the upper layer 300 may be formed to have a shape which covers the reinforcing part 120 and the extension parts 130 of the core member 100. The extension parts 130 may extend from the horizontal part 110 so as to prevent the horizontal part 110 and the reinforcing part 120 from being separated from each other in the forward and backward directions of the vehicle when external force in the vertical direction of the vehicle is applied to the lower cross member 1000 under the condition that the horizontal part 110 and the reinforcing part 120 are coupled.

Further, the lower layer 200 may be installed between the core member 100 and the vehicle floor, and the inner member 400 which is installed on the inner circumferential surface of the core member 100 may be provided along the closed curve formed by the cross-section of the core member 100. The core member 100, the upper layer 300, the lower layer 200 and the inner member 400 may be coupled to form a trapezoidal support structure, thus being capable of providing stronger supporting force.

Figure 7:
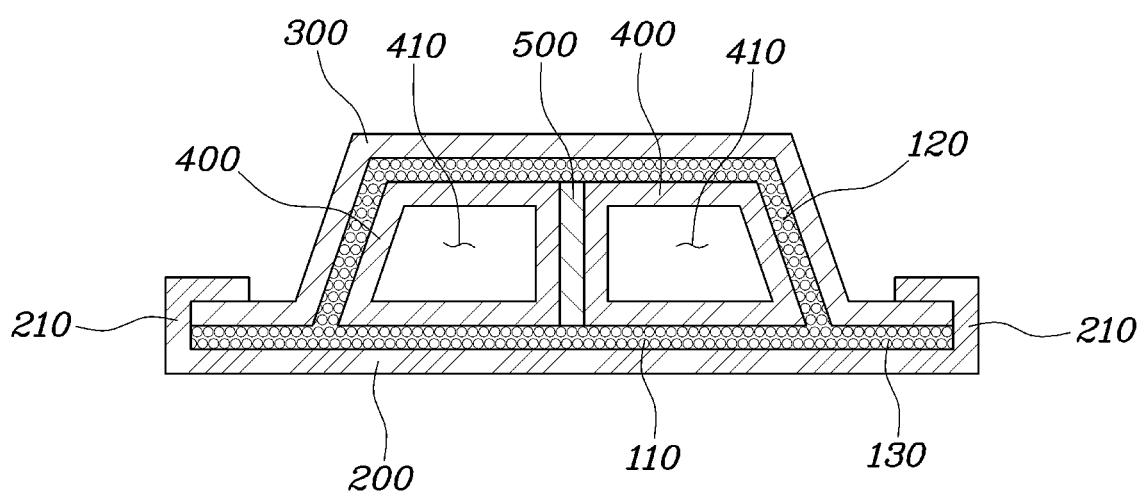
FIGS. 7 to 9 show cross-sectional views illustrating exemplary lower cross members according to an exemplary embodiments of the present invention.

As shown in FIG. 7, in a stack structure of a lower cross member 1000 according to an exemplary embodiment of the present invention, a core member 100 may include a horizontal part 110 coupled to the upper surface of a lower layer 200, a reinforcing part 120 protruding from the horizontal part 110 in the upward direction of the vehicle to form an inner space therein, and extension parts 130 respectively extending from the front and rear ends of the horizontal part 110 in the forward and backward directions of the vehicle, and a rib part 500 which traverses an inner space 410 may be provided between the horizontal part 110 and the reinforcing part 120 of the core member 100.

The rib part 500 may improve rigidity of the core member 100 in the vertical direction of the vehicle.

Further, one or more closed curves are formed within the core member 100 by the rib part 500, and thus, a plurality of inner members 400 may be installed on the inner circumferential surface of the core member 100 along the closed curves formed by the cross-section of the core member 100.

The core member 100 may be formed of a composite material including a conductive material, and thus, flange parts 210, which are bent upwards from both ends of the lower layer 200 in the forward and backward directions so as to surround both ends of the core member 100 and the upper layer 300 extending in the forward and backward directions, may be formed so as to block electrical conduction to vehicle body parts formed of other materials and to prevent galvanic corrosion.

Figure 8:
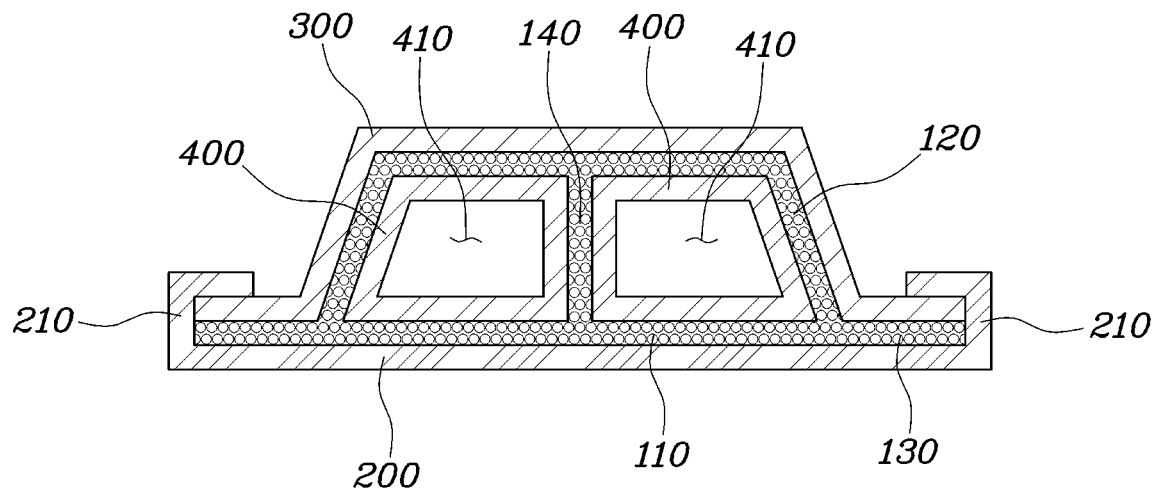

As shown in FIG. 8, in a stack structure of a lower cross member 1000 according to an exemplary embodiment of the present invention, a core member 100 may include a horizontal part 110 coupled to the upper surface of a lower layer 200, a reinforcing part 120 protruding from the horizontal part 110 in the upward direction of the vehicle to form an inner space therein, and extension parts 130 respectively extending from the front and rear ends of the horizontal part 110 in the forward and backward directions of the vehicle, and a support part 140 which extends in a direction intersecting the extending direction of the horizontal part 110 and traverses an inner space 410 formed by the horizontal part 110 and the reinforcing part 120 may be further provided between the horizontal part 110 and the reinforcing part 120 of the core member 100.

Further, one or more closed curves may be formed within the core member 100 by the support part 140, and thus, a plurality of inner members 400 may be installed on the inner circumferential surface of the core member 100 along the closed curves formed by the cross-section of the core member 100.

For example, the core member 100 may be formed of a composite material including a conductive material, and thus, flange parts 210, which are bent upwards from both ends of the lower layer 200 extending in the forward and backward directions so as to surround both ends of the core member 100 and the upper layer 300 extending in the forward and backward directions, may be formed so as to block electrical conduction to vehicle body parts formed of other materials and to prevent galvanic corrosion.

Further, through holes 1120 which is formed through the lower cross member 1000 may extend to the support part 140 or the rib part 500, and the support part 140 or the rib part 500 may be cut in regions in which the through holes 1120 are formed so that an air conditioning duct or a part extending in the forward and backward directions of the vehicle passes through the through holes 1120.

Figure 9:
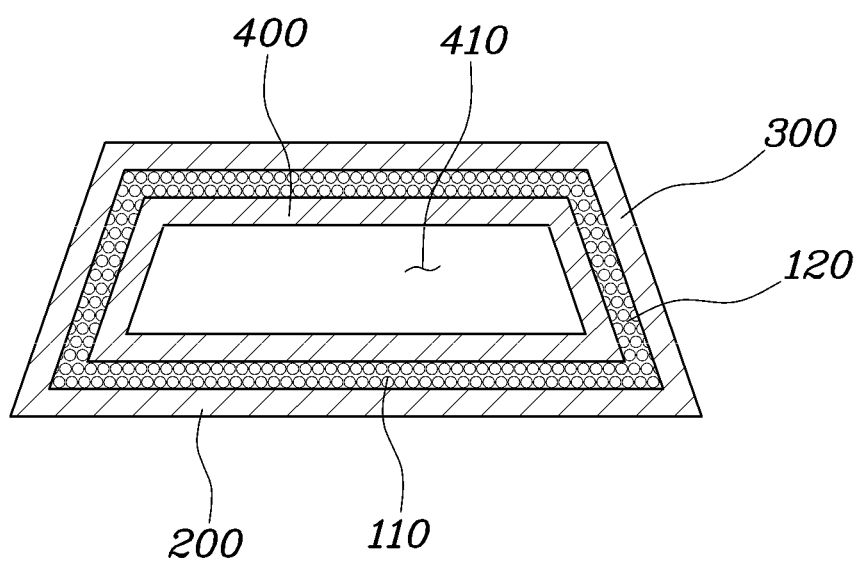

As shown in FIG. 9, in a stack structure of a lower cross member 1000 according to an exemplary embodiment of the present invention, a core member 100 may include a horizontal part 110 coupled to the upper surface of a lower layer 200 and a reinforcing part 120 protruding from the horizontal part 110 in the upward direction of the vehicle to form an inner space therein, both ends of the lower layer 200 and an upper layer 300 extending in the forward and backward directions of the vehicle may be connected to each other so as to surround the core member 100, and an inner member formed along a closed curve formed by the cross-section of the core member 100 may be installed on the inner circumferential surface of the core member 100.

As a method for stacking the respective elements of the lower cross member 1000 according to various exemplary embodiments of the present invention, the lower cross member 1000 may be formed by stacking the horizontal part 110 and the extension parts 130 of the core member 100, which are connected to each other, on the upper surface of the lower layer 200, stacking the inner member 400 on the upper surface of the horizontal part 110, stacking the reinforcing part 120 on the upper surface of the inner member 400 so as to surround the inner member 400 and to be connected to the horizontal part 110 to form the core member 100, and stacking the upper layer 300 on the upper surface of the core member 100, sequentially. Since the core member 100 is formed of unidirectional carbon fiber or bidirectional carbon fiber, the horizontal part 110 and the reinforcing part 120 may be easily stacked.

The lower cross member 1000 according to various exemplary embodiments of the present invention, which is formed of an anisotropic material so that only strength of a necessary portion thereof is increased, may provide an excellent weight reduction effect compared to conventional technology, have no deformation during side collision so as to firmly protect a safety region, and contribute to reduce a space necessary for collision therethrough, thereby being capable of securing additional battery capacity and thus increasing the range of the electric vehicle.

As is apparent from the above description, a lower cross member of a vehicle according to various exemplary embodiments of the present invention exhibits the following effects.

The lower cross member may achieve weight reduction of about 48% compared to a conventional lower cross member formed of steel, form a closed cross-section, and additionally include a rib.

In addition, the lower cross member may be manufactured using an inexpensive construction method, and thus have no heavy burden in production cost due to application of a composite material.

Further, the lower cross member may be scarcely damaged during side collision and thus firmly protect a safety space and reduce a necessary space against side collusion therethrough, thereby being capable of securing additional battery capacity and thus increasing the range of an electric vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lower cross member of a vehicle, comprising:
a core member disposed on a vehicle floor so as to extend in a width direction of the vehicle, formed of a composite material comprising unidirectional carbon fiber or bidirectional carbon fiber, and having a cross-section comprising at least one closed curve;
a lower layer extended in an extending direction of the core member, disposed between the core member and the vehicle floor, and formed of a composite material comprising a first multi-axial glass fabric;
an upper layer extended in the extending direction of the core member, disposed on an upper surface of the core member, and formed of a composite material comprising a second multi-axial glass fabric; and
at least one inner member coupled to an inner circumferential surface of the core member along the closed curve formed by the cross-section of the core member, extended in the extending direction of the core member, and formed of a composite material comprising a third multi-axial glass fabric.

2. The lower cross member according to claim 1, wherein each of the lower layer and the upper layer is formed of non-conductive glass fiber.

3. The lower cross member according to claim 1, wherein the at least one inner member is formed of a composite material comprising multi-axial glass fiber, aramid fiber or polyethylene fiber.

4. The lower cross member according to claim 1, wherein flange parts configured to be bent upwards from both ends of the lower layer extending in the forward and backward directions of the vehicle so as to surround both ends of the core member and the upper layer extending in the forward and backward directions of the vehicle are formed.

5. The lower cross member according to claim 1, further comprising a recess configured to be sunken in is formed in an upper surface of the upper layer or a lower surface of the lower layer, wherein the recess extends in an extending direction of the upper layer or the lower layer.

6. The lower cross member according to claim 1, wherein through holes are formed through the lower cross member in the forward and backward directions of the vehicle, and a part extending in the forward and backward directions of the vehicle passes through the lower cross member via the through holes.

7. The lower cross member according to claim 1, wherein:
the core member comprises a horizontal part coupled to an upper surface of the lower layer, a reinforcing part protruded from the horizontal part in an upward direction of the vehicle to form an inner space therein, and extension parts respectively extended from front and rear ends of the horizontal part in forward and backward directions of the vehicle; and
the upper layer is formed to have a shape covering the reinforcing part and the extension parts of the core member.

8. The lower cross member according to claim 7, wherein a support part configured to extend in a direction intersecting an extending direction of the horizontal part and to traverse an inner space formed by the horizontal part and the reinforcing part is provided between the horizontal part and the reinforcing part of the core member.

9. The lower cross member according to claim 1, wherein a plurality of mounting holes is formed through the lower cross member from an upper surface of the upper layer in a vertical direction of the vehicle.

10. The lower cross member according to claim 9, wherein: the core member comprises a horizontal part configured to be coupled to an upper surface of the lower layer and a reinforcing part configured to protrude from the horizontal part in an upward direction of the vehicle to form an inner space therein; and a rib part configured to be located adjacent to the mounting holes so as to increase strength of the lower cross member in the vertical direction of the vehicle and to traverse an inner space formed by the reinforcing part in a direction intersecting an extending direction of the horizontal part is provided between the horizontal part and the reinforcing part of the core member.

11. The lower cross member according to claim 10, wherein the rib part is formed of a composite material comprising multi-axial glass fiber, or unidirectional carbon fiber.

12. A vehicle comprising a lower cross member according to claim 1.

13. A lower cross member of a vehicle, comprising:
a core member disposed on a vehicle floor so as to extend in a width direction of the vehicle, formed of a composite material comprising unidirectional carbon fiber or bidirectional carbon fiber, and having a cross-section comprising at least one closed curve;
a lower layer extended in an extending direction of the core member, disposed between the core member and the vehicle floor, and formed of a composite material comprising a first multi-axial glass fabric; and
an upper layer extended in the extending direction of the core member, disposed on an upper surface of the core member, and formed of a composite material comprising a second multi-axial glass fabric; and
at least one inner member coupled to an inner circumferential surface of the core member along the closed curve formed by the cross-section of the core member, extended in the extending direction of the core member, and formed of a composite material comprising a third multi-axial glass fabric, wherein:
the core member comprises a horizontal part coupled to an upper surface of the lower layer, a reinforcing part protruded from the horizontal part in an upward direction of the vehicle to form an inner space therein, and extension parts respectively extended from front and rear ends of the horizontal part in forward and backward directions of the vehicle; and
the upper layer is formed to have a shape covering the reinforcing part and the extension parts of the core member.

* * * * *